Sept. 29, 1964 P. H. ARNOLD ETAL 3,151,220

REGISTER SENDER CIRCUIT

Filed May 11, 1961

7 Sheets-Sheet 1

INVENTORS P. H. ARNOLD
R. H. VEHMEIER

BY

J. A. McCorkendale

ATTORNEY

INVENTORS P. H. ARNOLD
R. H. VEHMEIER
BY J. R. McCorkendale
ATTORNEY

INVENTORS P. H. ARNOLD
R. H. VEHMEIER
BY
I. R. McCorkendale
ATTORNEY

Sept. 29, 1964 P. H. ARNOLD ETAL 3,151,220

REGISTER SENDER CIRCUIT

Filed May 11, 1961 7 Sheets-Sheet 4

INVENTORS P. H. ARNOLD
R. H. VEHMEIER

BY J. R. McCorkendale

ATTORNEY

REGISTER SENDER CIRCUIT

Filed May 11, 1961

7 Sheets-Sheet 5

INVENTORS P. H. ARNOLD
R. H. VEHMEIER
BY J. R. McCorkendale
ATTORNEY

INVENTORS P. H. ARNOLD
R. H. VEHMEIER
BY
J. R. McCorkendale
ATTORNEY

Sept. 29, 1964 P. H. ARNOLD ETAL 3,151,220

REGISTER SENDER CIRCUIT

Filed May 11, 1961 7 Sheets-Sheet 7

INVENTORS P. H. ARNOLD
R. H. VEHMEIER

BY G. A. McCorkendale

ATTORNEY

United States Patent Office 3,151,220

Patented Sept. 29, 1964

3,151,220
REGISTER SENDER CIRCUIT

Philip H. Arnold, Wickatunk, N.J., and Robert H. Vehmeier, Brooklyn, N.Y., assignors to Bell Telephone Laboratories, Incorporated, New York, N.Y., a corporation of New York Filed May 11, 1961, Ser. No. 109,444
13 Claims. (Cl. 179—27)

This invention relates to a register sender circuit and more particularly to such a circuit for converting pushbutton codes into pulse trains.

The function of the so-called "rotary dial" in automatic telephone switching systems is of course well established; as is well understood in the art this device, when operated by the subscriber or PBX attendant, serves to originate the pulse trains which, in turn, direct the selectors, connectors, or other switching circuits to extend the connection to the called party whose number was dialed. The rotary dial is commonly provided with a governor which exactly controls the speed of each return rotation (during which the impulses are transmitted) whereby to assure the uniformity in the pulse trains required for proper response by the associated switching equipment. The pulses may be transmitted at a rate of ten pulses per second for calls to a subscriber, by way of example, and at a rate of twenty pulses per second for calls to a direct dial central office trunk.

In recent years, and in a relatively limited number of installations, the rotary dial has been supplanted by so-called "pushbutton dials" or pushbutton call transmitters; by use of these devices the called number is transmitted simply by depressing the proper buttons, and many telephone subscribers feel that faster and more convenient "dialing" results from their use. Also, this type of call transmitter has proven particularly adaptable for use at PBX attendant's positions; this particular application will be described herein as illustrative of one possible use.

One type of pushbutton dialer which is used in these installations, and in connection with which our invention will be disclosed, operates on a "two-out-of-five" code; that is five dial code leads are provided, commonly being designated "0," "1," "2," "4" and "7," and for each digit "dialed" ground is applied to two out of these five leads according to the particular digit dialed. Now it will be apparent that, in order to permit the use of the conventional selectors, connectors and other switching equipment, it will be necessary to convert these various two-out-of-five codes into pulse trains of the nature produced by the standard rotary dial. (The term "dialed" as used herein is intended to contemplate, when appropriate, the transmission of a called number by a pushbutton calling device.)

Accordingly, it is an object of our invention to improve the originating and transmitting of calling information.

Another object of the invention is to convert pushbutton call transmitter codes into dial pulse trains.

Still another object of the invention is to automatically change on occasion the pulse transmission from a first definite rate to a second definite rate.

A still further object of the invention is to render feasible the recording of a larger than normal number of digits with only the normal number of digit storage units.

According to a specific embodiment of our invention a register sender capable of registering up to twelve digit number calls utilizes only the usual seven digit register units in the storage circuit. When a subscriber, or attendant, pushbutton dials a number, ground is applied to two of the five dial code leads, "0," "1," "2," "4" and "7." Each two-out-of-five code is steered to a register unit in the storage circuit. Stored information is passed on to a translator which starts the pulse generator at the end of the interdigital timing cycle to outpulse the digit. This process is repeated for each digit until an end-of-code signal comes from the storage circuit which is effective to operate the release relay. In order to permit registering up to a twelve-digit number with only the above-mentioned seven digit storage units, means are provided for recycling and clearing the first five storage units after the seventh digit has been dialed. Means are also provided for guarding against a premature release of these storage units in the event the attendant's dialing speed is substantially faster than the outpulsing speed.

A feature of the invention is means effective when "9" is dialed for a central office trunk for changing the pulse transmission from a rate of 10 P.P.S. to 20 P.P.S.

Another feature of the invention is visual means, also effective when "9" is dialed, for indicating when dial tone has been obtained and the remaining digits may be dialed.

A further feature of the invention is means for recycling the first steering relay, which was used when "9" was dialed, so that the first digit of the called number will be registered in the first unit of the storage circuit.

A still further feature of the invention is visual means energized in the event the sixth digit is pushbutton dialed before the fourth registered digit is being outpulsed whereby to indicate a too-rapid dialing speed.

Yet another feature of the invention is means for preventing recycling of the circuit, which normally occurs after transmission of the seventh digit, unless, and until, outpulsing from the circuit has reached a predetermined stage.

A full understanding of the arrangement contemplated by the present invention as well as an appreciation of the various advantageous features thereof may be gained from consideration of the following detailed description in connection with the accompanying drawing, in which.

Figure 9:
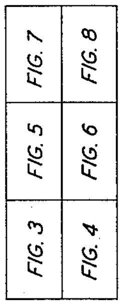
FIG. 9 shows the manner in which the figures should be joined when in use.
Figure 1:
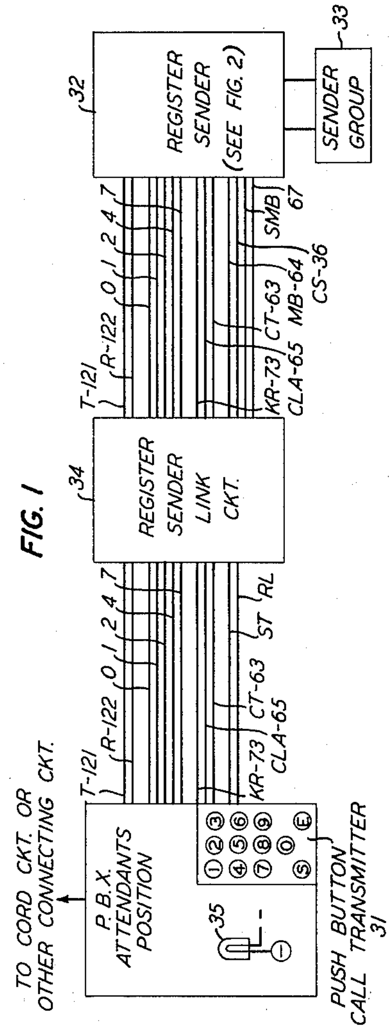
FIG. 1 shows schematically one way in which the register sender circuit contemplated by the present invention may be associated with other portions of a telephone system.

Referring now to the drawings, and first particularly to FIG. 1, a pushbutton call transmitter 31 is shown, being located for example at the attendant's position of a private branch exchange, and connected by way of register sender link circuit 34 to register sender 32, over suitable leads including five dial code leads designated respectively "0," "1," "2," "4" and "7." Connections are also provided from the register sender to sender group 33. Attendant's lamp 35 is provided at the attendant's position preferably being located adjacent to pushbutton call transmitter 31. It will be understood that the attendant's position circuit will be connected in the usual manner to a cord circuit or similar circuit.

Pushbutton call transmitter 31 and register sender link circuit 34 will not be described in detail herein since the present invention is not concerned with the specific arrangement of those items, but only with certain of the overall operations thereof which will be referred to in general terms. Call transmitter 31 may be any one of several general arrangements now available which operate on a two-out-of-five code basis; that is depression of a digit button or key results in connection of ground to a particular two of the five dial code leads depending upon the digit "dialed." In a manner described subsequently these codes from call transmitter 31 are converted in register sender 32 to either 10 P.P.S. or 20 P.P.S. trains and the pulse trains are transmitted into the connecting circuit.

Register sender link circuit 34 may be arranged through use of suitable multiple connecting means such, for example, as a 100-point crossbar switch, to serve a plurality of register senders, for example ten, and a plurality of positions, for example twenty. When ground is applied to the "ST" lead by operation of the start (S) button of the call transmitter, the register sender link circuit functions to connect an idle register sender to the attendant's position involved; when the register sender completes its function it signals back to the position circuit (as described in detail subsequently) which, in turn, removes the ground from the ST lead and releases the register sender link circuit and opens the connection between the position circuit and the associated register sender. When the register sender link circuit has selected an idle register sender and completed its connecting function, the various indicated leads from the position circuit, with the exceptions of the ST and RL leads, are connected through the register sender link circuit to the register sender.

*General Description*

Figure 2:
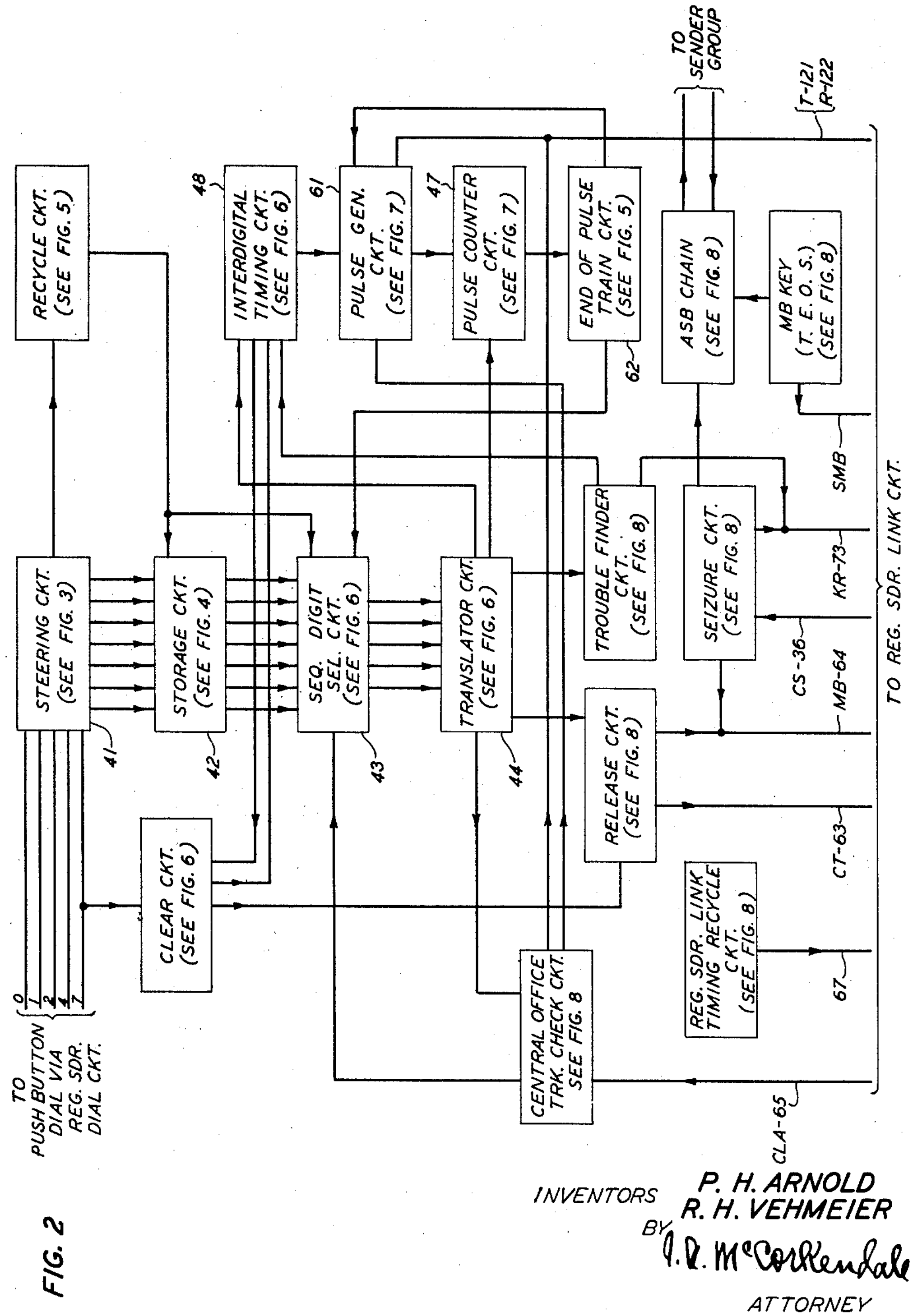
FIG. 2 shows schematically the relationship of the various individual circuits which comprise one specific illustraive embodiment of the register sender contemplated by the invention.
Figure 4:
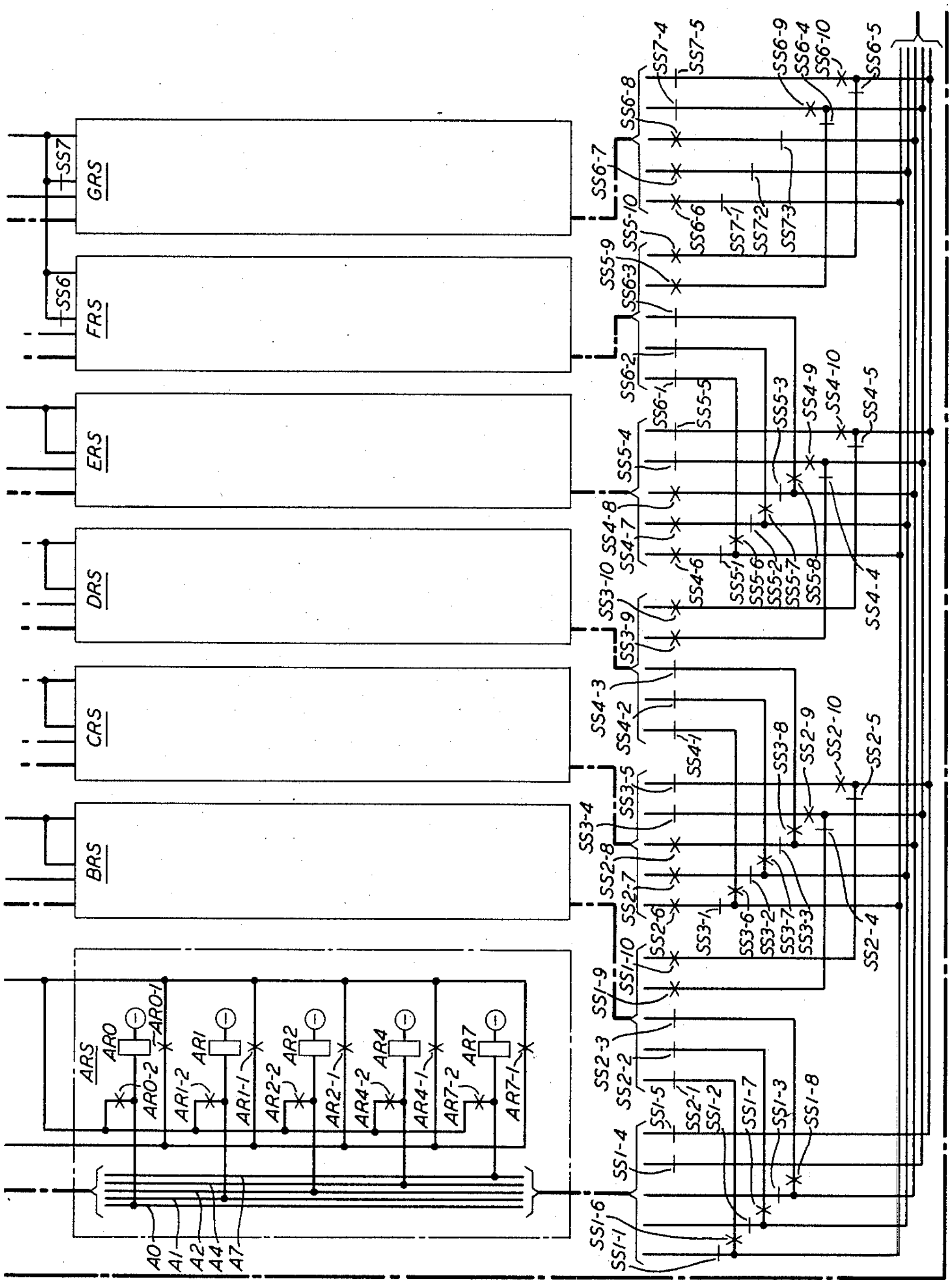
FIG. 4 shows the storage circuit of the register sender, one of the register units being illustrated in detail and the others being indicated schematically.

The arrangement and operation of the various components of register sender 32 will be described in detail subsequently in connection with FIGS. 3 to 8, inclusive, However, in order to first gain a general overall understanding of the arrangement, a brief general description will be given at this point with reference to FIG. 2. Assuming that the register sender 32 has been connected to the pushbutton dial circuit by register sender link circuit 34 in response to a "start" signal transmitted by operation of the "S" button of transmitter 31, and that the attendant is signaled to "start dialing" by the steadily lighted lamp signal 35, she then proceeds to pushbutton dial the number into register sender 32. As previously pointed out, for each button operation ground is applied to two of the five dial code leads. Each two-out-of-five code is directed by steering circuit 41 to the proper register unit of storage circuit 42. Each register unit preferably comprises a relay with five independent coils, each coil encompassing two glass enclosed dry reed switch contacts. The received code operates two of the five sets of reed switches which lock up under control of the sequential digit selector circuit 43.

Information stored, as above described, in storage circuit 42 is passed along to translator circuit 44 which thereupon conditions pulse counter circuit 47 and starts a cycle in interdigital timing circuit 48. At the end of the timing cycle, pulse generator 61 starts outpulsing, the pulses being counted by pulse counter circuit 47. When pulse counter circuit 47 has counted the particular number of pulses for which it has been conditioned, it activates end-of-pulse train circuit 62 which acts to stop the pulse train and release the information in translator circuit 44. The end-of-pulse train circuit 62 then signals the sequential digit selector circuit 43 causing it to step to the next storage circuit register unit. This process is repeated for each digit until an end-of-code signal is transmitted by storage circuit 42 which causes translator circuit 44 to operate a release relay, operation of which is effective to release the register sender.

As clearly brought out in the subsequent detailed description, the novel arrangement provided is such that, in the event a "long" number, for example one of eleven digits, is being dialed, a recycling operation normally takes place, after the seventh digit has been transmitted, and the first five storage units are cleared for reuse with the remaining digits of the number. However, a novel guarding means is provided for preventing a premature release of these storage circuits, that is, premature in the sense that the attendant's dialing progress has substantially outdistanced the outpulsing progress of the register sender.

Other novel arrangements contemplated by the invention will also be clear from the subsequent detailed description such, for example, as the operation of attendant's lamp 35, at "flutter" for two different purposes, first, at the initiation of a "dial 9" call as a "wait for dial tone" warning, and, second, during the dialing operation to warn the attendant if her dialing speed is too much faster than the outpulsing rate, this warning signal being given if the sixth digit is pushbutton dialed before the fourth digit has been outpulsed. In accordance with the novel arrangement contemplated, which will be described in detail subsequently, even though the attendant disregards the warning and continues to dial, recycling which ordinarily occurs after transmission of the seventh digit, is prevented until the outpulsing reaches the proper point.

*Detailed Description*

Figure 8:
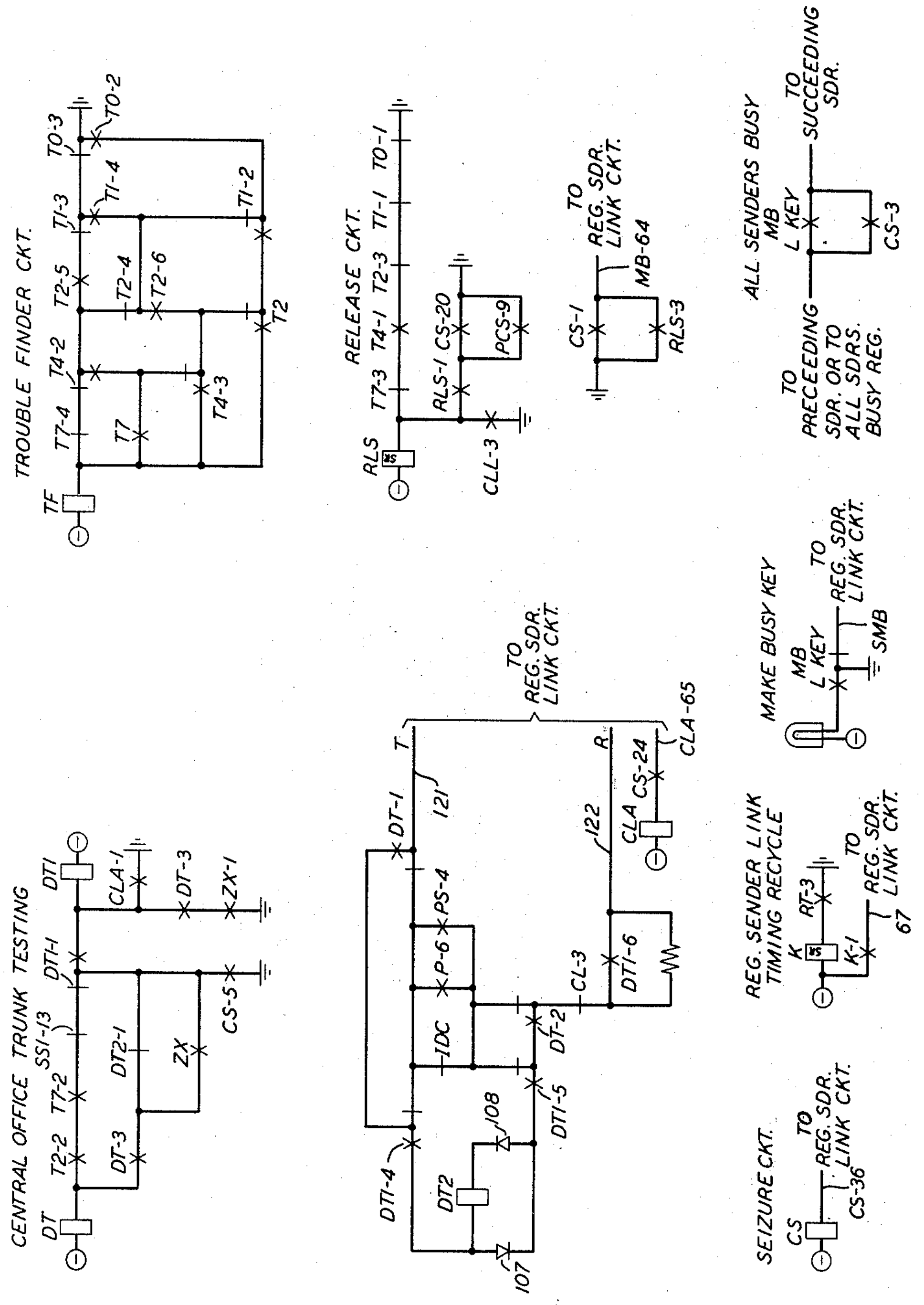
FIG. 8 shows the central office trunk testing circuit, trouble finder circuit, seizure circuit, release circuit, all senders busy circuit and register sender link timing recycle circuit of the register sender.

For a detailed description of the specific illustrative embodiment of the invention we will now assume that the attendant is preparing to pushbutton dial a number from her position by means of transmitter 31 (FIG. 1) and, further, that it is to be a central office trunk call. A signal transmitted from the attendant's position circuit by operation of the S (start) key, which applies ground to the ST (start) lead, causes the register sender link circuit to function and to connect the pushbutton call transmitter 31 through to an idle register sender 32. At this time ground is applied from the register sender link circuit over lead CS–36 to operate relay CS of the seizure circuit (FIG. 8).

Relay CS, operated applies ground through its make contact CS–1 to lead MB–64 (release circuit, FIG. 8) and through its make contact CS–2 to lead CT–63 (pulse generator, FIG. 7), both of which leads connect to the register sender link circuit, closes through its CS–3 make contact a shunt path in the "All Senders Busy" chain (FIG. 8), and completes a path for operation of relay PS (FIG. 7) traced from battery, winding of relay PS, break contact 1DC–1 of relay 1DC, make contact CS–4 of relay CS to ground.

Closure of ground through lead CT–63 to the register sender link circuit 34 causes that circuit to cause lamp 35 at the attendant's position to light "steady" as an indication to the attendant that the register sender 32 (FIG. 1) is in condition to receive pushbutton dial pulses. Relay CS, operated, also completes at its make contact CS–24 a path for operation of relay CLA (FIG. 8), from ground supplied over lead CLA–65, to indicate the connection of a sender to the switchboard position.

*Attendant Dials "9"*

As pointed out above, it is being assumed first that the attendant wishes to be connected to a direct dial central office trunk and, accordingly, when she is appraised by steadily lighted lamp 35 that the register sender is ready to receive pulses, she depresses the "9" digit button of call transmitter 31 thereby grounding digit leads "7" and "2" which pass through register sender link circuit 34 to the register sender 32.

It should be pointed out here that for purposes of simplification and clarity, there has been shown in detail only one storage unit ARS (FIG. 4); it will be understood that six other similar storage units BRS to GRS inclusive are provided, these are indicated simply by captioned rectangles. A similar simplification of the multipled digit leads and of the digit selecting relays D1–D7, has been carried out in FIG. 3 and in these two figures; as well as in FIGS. 5 and 6, dot-dash lines with brackets are utilized in an obvious manner to show the carrying over of groups of leads from one point to another.

Figure 3:
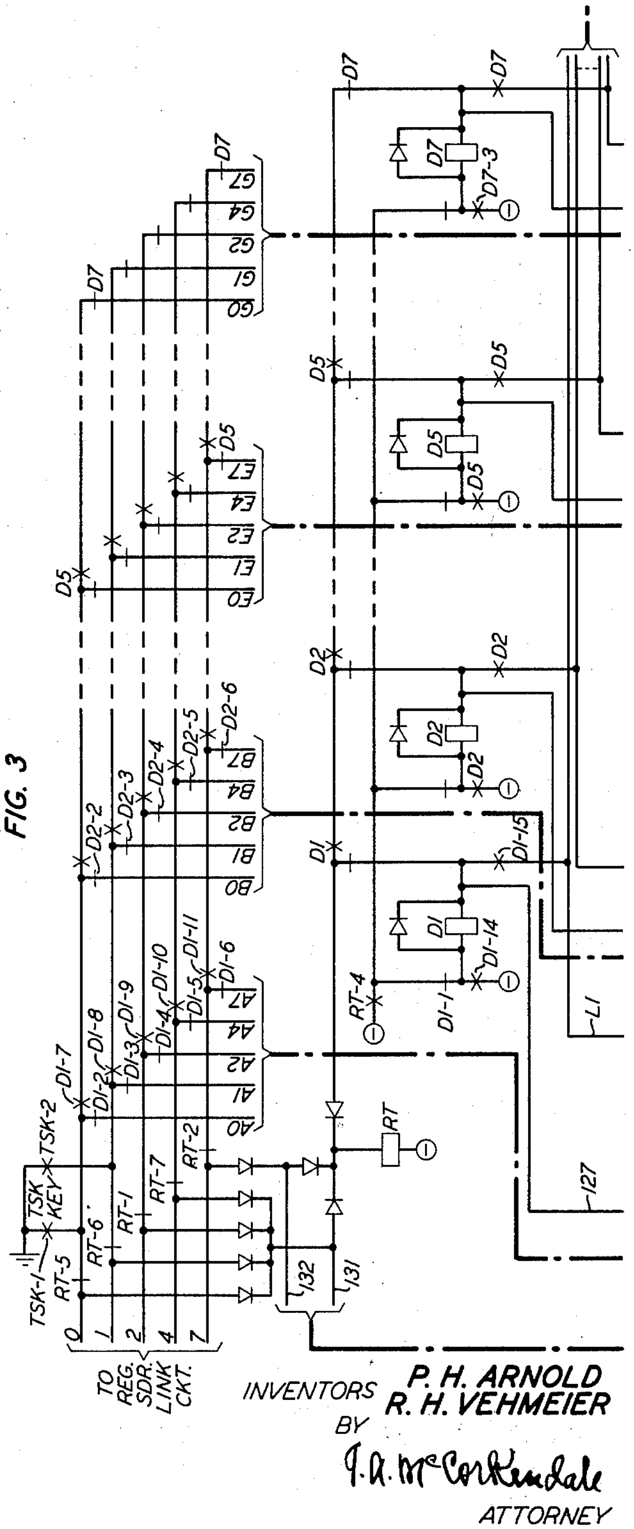
FIG. 3 shows paricularly the steering circuit of the register sender.

Returning now to circuit operations following application of ground to digit leads "2" and "7," the ground on lead A2 (FIG. 3) causes operation of relay AR2 of the ARS storage unit (FIG. 4) while, similarly, the ground on lead A7 causes operation of relay AR7 of the same storage unit. Also, following the dot-dash and bracketed indications, the ground on lead A2 causes operation of relay T2 of the translator (FIG. 6), and the ground on lead A7 causes operation of relay T7 of the translator together with relay RT (FIG. 3).

Relay AR2, upon operating, locks over a path from battery, its operating winding and make contact AR2–2, lead L1, break contacts RC–1 of relay RC and DT1–8 of relay DT1 (recycle circuit, FIG. 5), make contact CS–13 of relay CS to ground. Similarly, relay AR7, upon operating, locks through its make contact AR7–2 over this same path.

Relay RT, operated, opens at its break contacts RT–1 and RT–2 respectively digit leads "2" and "7," whereby to prevent possible double digit registration, and also completes an obvious path through its make contact RT–3 for operation of relay K of the register sender link timing recycle circuit (FIG. 8); operation of relay K in turn connects battery through its make contact K–1 over lead 67 to the register sender link circuit causing a time alarm circuit included therein to function. Digit leads "0," "1" and "4" are also opened by operation of relay RT at respective break contacts RT–5, RT–6 and RT–7. Relay RT, upon operating also closes at its make contact RT–4 a path for supply of battery potential to the operating windings of the seven-digit steering relays D1 to D7 (FIG. 3), four of which D1, D2, D5 and D7 are shown as typical of all seven.

The first digit steering relay D1 operates at this time over a path from battery, make contact RT–4 of relay RT, break contact D1–1 and operating winding of relay D1, lead 127, make contacts AR2–1 of relay AR2 and AR7–1 of relay AR7, lead L1, break contacts RC–1 of relay RC and DT1–8 of relay DT1 (FIG. 5), make contact CS–13 of relay CS to ground; relay D1 upon operating locks to this same path through its make contacts D1–14 and D1–15.

Relay D1, operated, interrupts at its break contacts D1–2, D1–3, D1–4, D1–5 and D1–6 the connection of the digit leads to the ARS storage unit, and closes at its make contacts D1–7, D1–8, D1–9, D1–10 and D1–11 paths through break contacts D2–2, D2–3, D2–4, D2–5 and D2–6 of relay D2 for connection of these digit leads to the second storage unit BRS for subsequent storage of the second digit.

It will be understood that the other digit selecting relays D2 to D7 operate in turn, over paths similar to that described in connection with relay D1, as the paths are completed in turn by operation of relays in the respective storage units. This assures that each subsequent digit will be steered in turn to the proper respective storage unit. However, a novel feature of the present invention should be noted here whereby, when a "dial 9" call is initiated and the digit "9" is stored in the first storage unit, the circuit is in effect recycled so that the first digit of the actual number when dialed will be stored in the first storage unit ARS rather than in the second. This is accomplished by the inclusion in the operating paths for the digit selecting relays, as described above, break contacts DT1–8 of relay DT1 and DT–7 of relay DT; relays DT1 and DT are in operated condition in connection with the seizure of a central office trunk in response to "dial 9" and the "stepping" path for the digit steering relays is therefore open and the digit leads remain connected to the first storage unit ARS.

Operation of the translator relays T2 and T7 as mentioned above opens at their respective T2–1 and T7–1 break contacts the path over which battery was supplied to start anode 68 of the interdigital timing gas tube 71 (FIG. 6); operation of relays T2 and T7 also completes a path for operation of relay DT of the central office trunk testing circuit (FIG. 8), this path being traced from battery, winding of relay DT, make contacts T2–2 of relay T2 and T7–2 of relay T7, break contacts SS1–13 of relay SS1 and DT1–1 of relay DT1, make contact CS–5 of relay CS to ground.

It should be noted here that relay DT is an essential part of the arrangement involving one function of attendant's lamp 35 (FIG. 1), that is causing the lamp to light at "flutter" as an indication to the attendant not to dial further until the central office conditions itself for pulses, that is in effect until "dial tone" is present.

Relay DT, operated, completes a path from flutter circuit 72 (FIG. 5), which includes a source of ground interrupted at the desired "flutter" rate, make contact DT–2 of relay DT, break contact TF–1 of relay TF, make contacts CS–6 of relays CS, lead KR–73 to the register sender link circuit 34 and thence to attendant's lamp 35 which is caused to light at "flutter" as a "stop dial" indication to the attendant until the central office trunk has conditioned itself to receive pulses.

*Interdigital Timing*

As pointed out above operation of translator relays T2 and T9 resulted in removal of the negative battery potential from start anode 68 of the timing tube 71 (FIG. 6); this triggers and starts operation of the interdigital timing circuit. Capacitor 74 which is connected from start anode 68 of gas tube 71 to ground through break contact CL–1 of relay CL and limiting resistor 77, is charged from positive battery potential, make contact CS–7 of relay CS, break contact PC–1 of relay PC, winding of relay 1DC, break contacts 1DC–2 of relay 1DC and CL–2 of relay CL, and through resistors 78 and 91 and potentiometer 92 in series. Potentiometer 92 may be adjusted to fix the interdigital time in this instance at approximately 700 milliseconds (as will be brought out subsequently this period is changed after "9" has been dialed).

When capacitor 74 has been charged to a sufficient value for breakdown voltage across the start gap of tube 71, the tube fires and relay 1DC is operated by the current flowing through the main gap of the tube. Relay 1DC, operated, holds to ground through its make contact 1DC–3, extinguishes tube 71 by opening the current path at its break contact 1DC–2, connects negative battery potential through its make contact 1DC–4 to start anode 68 of tube 71, opens at its break contact 1DC–1 the shunt path around break contact P–1 and make contact P–2 of relay P (FIG. 7), and completes a path through its make contact 1DC–5 for starting the pulse generator (FIG. 7).

Sender test key TSK, nonlocking (FIG. 3) with make contacts TSK–1 and TSK–2 may be used in preliminary adjustment of potentiometer 92.

*Pulse Generating*

Figure 7:
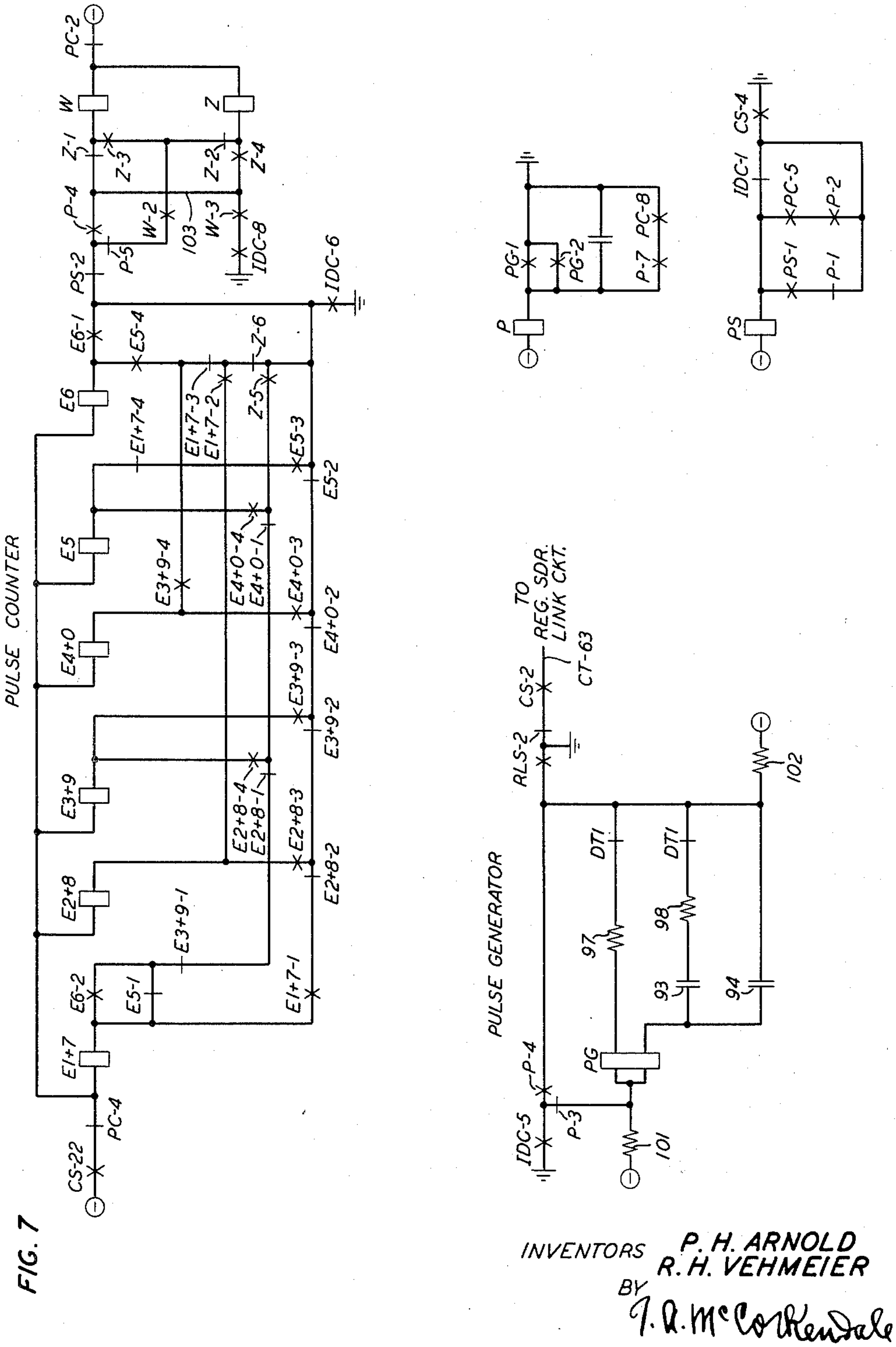
FIG. 7 shows the pulse counter circuit and the pulse generator circuits of the register sender.

When relay 1DC operates, as above described, ground is applied through its make contact 1DC–5 and break contact P–3 of relay P to relay PG which is a two-winding, polar relay, preferably provided with mercury contacts (FIG. 7). Relays PG and P together constitute a self-interrupting pulsing circuit; the timing of the pulses is controlled by suitably selected capacitors 93 and 94 and resistors 97, 98, 101 and 102. The secondary winding of relay PG is connected at both ends to negative battery through respective resistors 101 and 102. The two windings of the PG relay are preferably wound in opposition to each other with the negative terminal of the primary winding connected to the positive terminal of the secondary winding and the positive terminal of the primary winding connected to the capacitors 93 and 94.

With relay P normal, i.e., released, current is applied to the secondary winding of relay PG in the direction to operate the relay but this action is opposed by the current in the primary winding which is charging capacitor 93. As the charging current reduces toward zero, the secondary winding will cause operation of relay PG. Relay PG, operated, completes through its make contacts PG–1 and PG–2 an obvious operating path for relay P; relay P by its operation in effect transposes at its break contact P–3 and make contact P–4 the battery and ground connections to the primary and secondary circuits of relay PG. The current in the secondary winding of relay PG will now be in the direction to cause the relay to release, but since capacitors 93 and 94 will charge in the reverse direction tending to hold the relay operated, release of the relay will be delayed until the current in the secondary winding builds up sufficiently. When relay PG releases, relay P also releases and the first described conditions of the circuit are restored. The duration of the operated-released positions of relay PG is determined by the values of the resistors; in general increasing the value of resistor 97 will decrease the pulse speed while increasing the value of resistor 101 will decrease the percent break.

Relay P by its operate-nonoperate action sends pulses out over the tip conductor 121 and ring conductor 122 (FIG. 8) by opening and closing the pulsing loop at its make contact P–6.

Since the first pulse produced by the pulse generator will be distorted due to the fact that capacitors 93 and 94 are starting to charge from zero voltage, it is desirable that this pulse be shorted out. This is accomplished through the PS relay (FIG. 7) which, as pointed out above, operated following the operation of the CS relay. Relay PS upon operating locks over a path from battery, winding and make contact PS–1 of relay PS, break contact P–1 of relay P, make contact CS–4 of relay CS to ground, and does not release therefore upon operation of relay 1DC. While relay PS is operated the pulse input path to the pulse counter circuit (FIG. 7) is open at break contact PS–2 of relay PS so that the first pulse (while relay PS is still operated) is not applied to the pulse counter circuit and is not counted; also, the pulse is not transmitted since the line loop pulsing contact P–6 of relay P is shunted by make contact PS–4 of relay PS (FIG. 8). However, after production of the initial pulse, relay P operates as above described, the holding path for relay PS is opened at break contact P–1 of relay P, relay PS releases and the input path to the pulse counter is closed at break contact PS–2 of relay PS.

*Pulse Counting and End-of-Pulse Operation*

The pulse counter (FIG. 7) is a 10-pulse, partially recycling, counter which utilizes six relays designated according to the pulses by which they are operated; i.e., relay E1+7 is operated by the first and seventh pulses, relay E3+9 by the third and ninth pulses and so on. The pulses produced by the pulse generator are divided by pulse dividing relays W and Z of the pulse counter circuit before being counted by the counting relays E1+7 through E6. The relays continue to divide pulses issuing from the P relay until the PC relay operates at the end of the pulse train as subsequently described.

Relay W operates when relay P operates (and after relay PS has released following the initial pulse) over a path from battery, break contact PC–2 of relay PC, winding of relay W, break contact Z–1 of relay Z, make contact P–4 of relay P, break contact PS–2 of relay PS, make contact 1DC–6 of relay 1DC to ground, following which relay Z operates when relay P releases over a path from battery, break contact PC–2 of relay PC, winding and break contact Z–2 of relay Z, make contact W–2 of relay W, break contact P–5 of relay P, break contact PS–2 of relay PS, make contact 1DC–6 of relay 1DC to ground; the W relay is temporarily held through make contact Z–3 of relay Z and its own make contact W–2, but releases upon the second operation of relay P which interrupts this temporary holding path at its break contact P–5. While relay W is held, a holding path for relay Z is established through its operating winding and make contact Z–4, make contacts W–3 of relay W and 1DC–8 of relay 1DC to ground. After relay W releases, relay Z is temporarily held over a path through its Z–4 make contact and lead 103, but releases on the second release of relay P since the temporary holding path is then opened at make contact P–4 of relay P. The entire operation now repeats; thus when the Z relay operates an odd pulse is sent to the counter and an even pulse is sent when the Z relay releases.

Because of the operation of translator relays T2 and T7 (dial "9"), all make contacts of these two relays will be operated in the end-of-pulse circuit (FIG. 5) whereby to properly "mark" this circuit; specifically the make contacts involved are make contacts T2–7 and T2–8 of relay T2 and make contacts T7–6, T7–7 and T7–8 of relay T7. The end-of-pulse circuit is now "set" to count nine pulses in the pulse counter circuit (FIG. 7).

When relay Z is in operated position as above described, relay E1+7 will operate to count the first pulse over a path from battery, make contact CS–22 of relay CS, break contact PC–4 of relay PC, winding of relay E1+7, break contacts E5–1 of relay E5, E3+9–1 of relay E3+9, E2+8–1 of relay E2+8, and E4+0–1 of relay E4+0, make contacts Z–5 of relay Z and 1DC–6 of relay 1DC to ground; relay E1+7 upon operating locks to ground through its make contact E1+7–1, break contacts E2+8–2 of relay E2+8, E3+9–2 of relay E3+9, E4+0–2 of relay E4+0, and E5–2 of relay E5 and make contact 1DC–6 of relay 1DC.

Now when relay Z releases, relay E2+8 will operate to count the second pulse over a path from battery, make contact CS–22 of relay CS, break contact PC–4 of relay PC, winding of relay E2+8, make contact E1+7–2 of relay E1+7, break contact Z–6 of relay Z, make contact 1DC–6 of relay 1DC to ground; relay E2+8 upon operating locks through its make contact E2+8–3 to the ground on make contact 1DC–6 of relay 1DC and at the same time interrupts at its break contact E2+8–2 the holding path for relay E1+7 which thereupon releases.

When relay Z next operates, relay E3+9 operates to count the third pulse over a path from battery, make contact CS–22 of relay CS, break contact PC–4 of relay PC, winding of relay E3+9, make contact E2+8–4 of relay E2+8, break contact E4+0–1 of relay E4+0, make contacts Z–5 of relay Z and 1DC–6 of relay 1DC to ground; relay E3+9 upon operating locks to ground through its make contact E3+9–3 and interrupts at its E3+9–2 break contact the holding path for relay E2+8 which thereupon releases.

Upon release of relay Z, relay E4+0 operates to count the fourth pulse over a path from battery, make contact CS–22 of relay CS, make contact PC–4 of relay PC, winding of relay E4+0, make contact E3+9–4 of relay E3+9, break contacts E1+7–3 of relay E1+7 and Z–6 of relay Z, make contact 1DC–6 of relay 1DC to ground; relay E4+0, upon operating, locks to ground through its make contact E4+0–3 and interrupts at its E4+0–2 break contact the holding path for relay E3+9 which releases.

Next, upon reoperation of relay Z, relay E5 operates to count the fifth pulse over a path from battery, make conact CS–22 of relay CS, break contact PC–4 of relay PC, winding of relay E5, make contact E4+0–4 of relay E4+0, make contacts Z–5 of relay Z and 1DC–6 of relay 1DC to ground; relay E5 upon operating locks over a path through break contact E1+7–4 of relay E1+7, its own make contact E5–3 and make contact 1DC–6 of relay 1DC to ground and interrupts at its break contact E5–2 the holding path for relay E4+0 which releases. Relay E5, operated, also interrupts at its break contact E5–1 one of the shunt paths to the winding of relay E1+7.

Relay E6 operates to count the sixth pulse, when relay Z next releases, over a path from battery, make contact CS–22 of relay CS, break contact PC–4 of relay PC, winding of relay E6, make contact E5–4 of relay E5, break contacts E1+7–3 of relay E1+7 and Z–6 of relay Z, make contact 1DC–6 of relay 1DC to ground; relay E6 upon operating holds operated through its make contact E6–1 and make contact 1DC–6 of relay 1DC to ground until the circuit is subsequently released by the operation of relay PC after which relay 1DC releases.

Relay E6, operated, partially reestablishes at its S6–2 make contact the operating path for relay E1+7 for subsequent operation on the seventh pulse.

Relay E1–7 again operates, this time to count the seventh pulse, when relay Z reoperates, over a path from battery, make contact CS–22 of relay CS, break contact PC–4 of relay PC, winding of relay E1+7, make contact E6–2 of relay E6, break contacts E3+9–1 of relay E3+9, E2+8–1 of relay E2+8, and E4+0–1 of relay E4+10, make contacts Z–5 of relay Z and 1DC–6 of relay 1DC to ground; upon operating, relay E1+7 locks as before through its E1+7–1 make contact. Relay E5 releases at this point as its holding path is interrupted at break contact E1+7–4 of relay E1+7.

Over paths previously traced, relays E2+8 and E3+9 will now operate in turn to count the eighth and ninth pulses, relay E1+7 releasing upon operation of relay E2+8 and relay E2+8 releasing upon operation of relay E3+9. Relay E3+9, as before, locks through its E3+9–3 make contact. At this point since the nine pulses have been counted we should find a path completed in the end-of-pulse circuit (FIG. 5) for terminating the pulsing; as stated above all make contacts of relays T2 and T7 are closed, since these two translator relays are operated, and a path is completed, therefore, for operation of relay PC which is traced from battery, make contact CS–23 of relay CS, operating winding of relay PC, break contacts E1+7–5 of relay E1+7 and E2+8–5 of relay E2+8, make contact E3+9–5 of relay S3+9, break contacts E4+0–5 of relay E4+0 and E5–5 of relay E5, make contacts E6–3 of relay E6, T7–8 of relay T7 and T2–7 of relay T2 to ground. Relay PC, upon operating, will lock over a path from battery, make contact CS–23 of relay CS, its operating winding and make contact PC–7, make contact E3+9–5 of relay E3+9 to ground; an alternate locking path to ground is also provided through make contact 1DC–7 of relay 1DC. Relay PC, operated, operates through its PC–6 make contact relay PCS and also performs other functions which will be described below.

It is believed that the functioning of the pulse counter in counting other numbers of pulses will be clear from the above description of counting nine pulses and that the accompanying operation of the end-of-pulse circuit will likewise be clear. For example, assuming that the digit "4" were dialed, relay E4+0 of the pulse counter would ultimately be operated and locked while relays T0 and T4 of the translator would be operated with consequent closure in the end-of-pulse circuit of make contacts T4–4 and T4–5 of relay T4 and make contacts T0–4, T0–5, T0–6, and T0–7 of relay T0. Thus, upon operation of relay E4+0 in counting the fourth pulse, a path is completed for operation of relay PC traced from battery, make contact CS–23 of relay CS, winding of relay PC, break contacts E1+7–5 of relay E1+7, E2+8–5 of relay E2+8, E3+9–6 of relay E3+9, make contact E4+0–6 of relay E4+0, break contacts E5–5 of relay E5 and E6–4 of relay E6, make contacts T0–4 of relay T0 and T4–5 of relay T4 to ground. Relay PC operates and locks to ground through its make contact PC–7 and make contact E4+0–7 of relay E4+7.

Relay PC, operated, provides a locking path for relay P (FIG. 7) traced from battery, winding and make contact P–7 of relay P, make contact PC–8 of relay PC to ground; by so arranging the circuit that relay PC is energized during the last pulse break interval and thereby providing a locking path for the P relay, a complete cycle of make interval plus break interval is made available for ending the pulse train.

The translator circuit (FIG. 6) comprises relays T0, T1, T2, T4 and T7 which are operated in two-out-of-five manner from the code information supplied to the storage units and transmited under control of the sequential digit selector circuit. The information is translated into one out of ten code information which is applied to the pulse counter as above.

Following the completion of each digit the PC relay operates as already stated above and removes at its PC–3 break contact the common battery of the translator relays (FIG. 6), removes at its PC–4 break contact the common battery of the pulse counter relays (FIG. 7), and opens at its PC–1 break contact one of the shunt holding paths for relay 1DC (FIG. 6) which is now held through break contact PS–3 of relay PS. Now when the P relay operates to complete the last pulse of the digit, it operates the PS relay (FIG. 7) over a path from battery, winding of relay PS, make contact PC–5 of relay PC and make contact P–2 of relay P, make contact CS–4 of relay CS to ground. Operation of relay PS interrupts at its break contact PS–3 the alternate holding path for relay 1DC (FIG. 6) which releases.

Relay 1DC upon releasing opens at its 1DC–7 make contact the holding path for relay PC (FIG. 5) which releases (assuming all pulse counter relays released); release of relay PC in turn opens at its PC–6 make contact the operating path for relay PCS which subsequently releases. Relay PCS is made slow to release whereby to insure sufficient operating time for the sequential digit selecting circuit, and, while operated, temporarily opens at its break contacts PCS–1, PCS–2, PCS–3, PCS–4 and PCS–5 the individual battery leads of the translator relays whereby to prevent a possible invalid registration, and also completes an operating path for relay ZX of the sequential digit selecting circuit (FIG. 6) traced from ground at the end-of-pulse circut (FIG. 5) make contacts PCS–6, (FIG. 5) and PCS–7 (FIG. 6) of relay PCS, break contact WX–1 of relay WX, winding of relay ZX to battery. (Relay ZX together with relay WX are major items in controlling the sequence in which the translator is connected to the storage units; this will be further described subsequently.)

Relay ZX, operated, completes an operating path for relay DT1 of the central office trunk testing circuit (FIG. 8), which path is traced from battery, winding of relay DT1, make contact DT–3 of relay DT, make contact ZX–1 of relay ZX to ground.

*Central Office Trunk Seizure*

Figure 6:
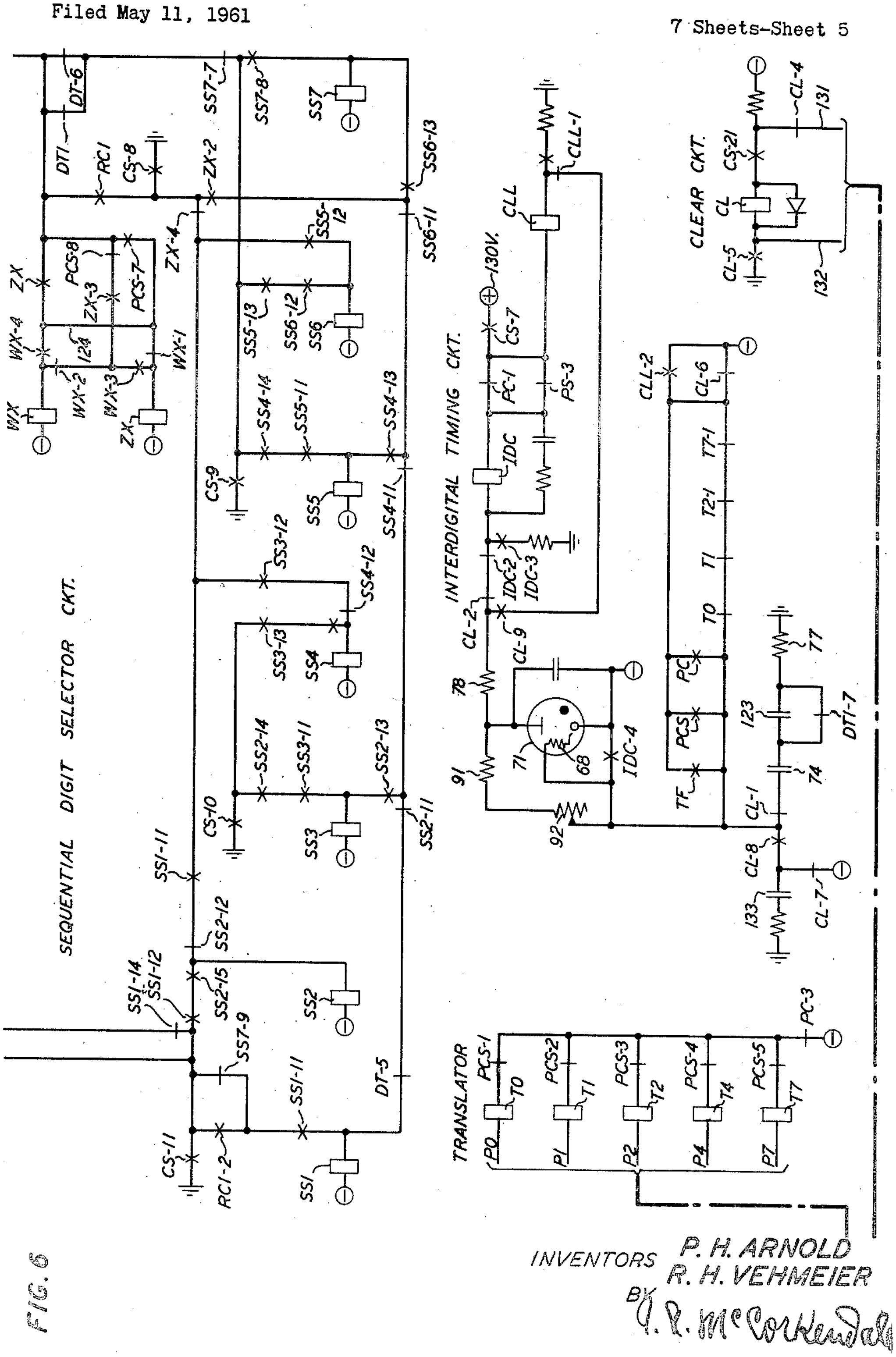
FIG. 6 shows the clear circuit, the sequential digit selector circuit, the translator circuit, and the interdigital timing circuit of the register sender.

Operation of relay DT1, as above, connects the diode polarized relay bridge, comprising diodes 107 and 108 and relay DT2 (FIG. 8), across tip conductor 121 and ring conductor 122 toward the central office trunk, this connection being over a path including make contacts DT1–4 of relay DT1 and DT–1 of relay DT to the tip 121 and over a path including make contact DT1–5 of relay DT1, make contact DT–2 of relay DT, break contact CL–3 of relay CL and make contact DT1–6 of relay DT1 to the ring 122. Relay DT1, operated, also is effective to change the interdigital timing period from 700 milliseconds (as above described in reference to FIG. 6) to 300 milliseconds, this change resulting from the opening at break contact DT1–7 of DT1 the shunt path previously connected across capacitor 123 (FIG. 6). This shortening of the interdigital time results in the "faster" dialing which is feasible, and usually desired, on a direct dial central office trunk call. (It should be noted that relay DT1 may also be operated, and the interdigital period changed, under different circumstances. For example in certain situations a central office trunk cord may be seized directly in which event relay CLA (FIG. 8) will operate as described above thereby completing through its make contact CLA–1 an obvious operate path for relay DT1.)

Upon completion of outpulsing of the registered "9," the selector will seize an idle central office trunk and, when the seized trunk is ready to receive pulses, it will in line with its normal method of operation connect battery to the tip conductor 121 and ground to the ring conductor 122 (FIG. 8) which operates relay DT2 over the paths described in the preceding paragraph.

Operation of relay DT2 releases at its DT2–1 break contact relay DT which, after operating as described above, was held through its make contact DT–3, break contact DT2–1 of relay DT2 and make contact CS–5 of relay CS to ground. As previously pointed out above in connection with FIG. 5, at the time relay DT operated attendants' lamp 35 (FIG. 1) was energized at "flutter" from flutter circuit 72, make contact DT–2 of the DT relay, break contact TF–1 of relay TF, make contact CS–6 of relay CS and out over lead KR–73. Now upon the release of relay DT, steady ground is substituted for the intermittent ground of flutter circuit 72 over a path from ground, break contact D6–1 of relay D6, break contacts SS7–1 of relay SS7, DT–4 of relay DT and TF–1 of relay TF, make contact CS–6 of relay CS over lead KR–73; attendants' lamp 35 now lighted at "steady" indicates "start dialing" to the attendant.

As previously described above under the section, "Attendant Dials 9," the storage and digit selecting relay circuits are, in effect, recycled after the digit 9 has been dialed for seizure of a central office trunk, so that the first digit of the actual subscriber's number when dialed will be stored in the first storage unit rather than the second.

*Digit Selecting*

Figure 5:
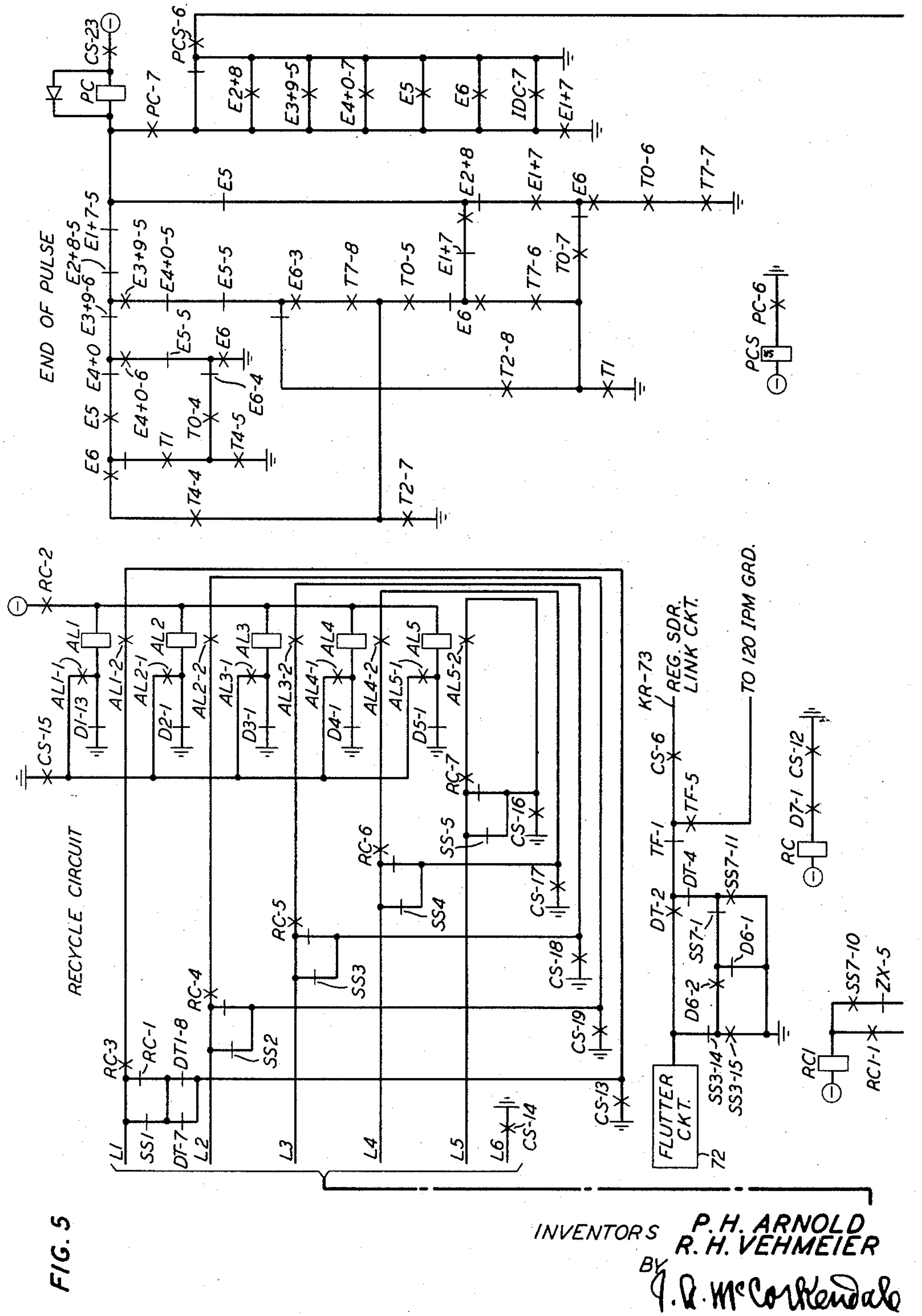
FIG. 5 shows the recycle and end-of-pulse train circuits of the register sender.

The sequential digit selecting circuit (FIG. 6) is utilized to connect the translator to the storage units (FIG. 4) in a properly controlled sequence. This control is exercised principally through the WX and ZX relays of the sequential digit selecting circuit and the RC and RC1 relays of the recycle circuit (FIG. 5).

The first digit path (contemplating recycle following the dialing of "9" as above described) extends from the ground stored on two-out-of-five reed switches of the ARS storage unit through break contacts SS1–1 to SS1–5, inclusive, of digit selecting relay SS1 to the operating windings of the corresponding two-out-of-five relays T0, T1, T2, T4 and T7 of the translator.

The second digit path extends from the second storage unit BRS over paths including respective series connection of break contacts SS2–1 to SS2–5 of second digit selecting relay SS2 and make contacts SS1–6 to SS1–10 of the first digit selecting relay SS1.

The other digit paths are completed in a generally similar manner; for example the fourth digit path extends from the fourth storage unit DRS (not shown in detail) over paths including respective series connections of break contacts SS4–1, SS4–2, SS4–3, SS4–4 and SS4–5 of the fourth digit selecting relay SS4 and make contacts SS3–6, SS3–7 SS3–8, SS3–9 and SS3–10 of the third digit selecting relay SS3.

As pointed out above the PC and PCS relays (FIG. 5) operate following the completion of each digit; this causes operation of relay ZX of the sequential digit selecting circuit (FIG. 6). The first operation of relay ZX causes operation of sequential digit selecting circuit relay SS1 (FIG. 6) over a path from battery, winding of relay SS1, break contact DT–5 of relay DT (which, as above described, released following operation of relay DT2, FIG. 8), break contacts SS2–11 of relay SS2, SS4–11 of relay SS4 and SS6–11 of relay SS6, make contact ZX–2 of relay ZX, make contact CS–8 of relay CS to ground. Relay SS1, operated, steers the second digit recorded in storage unit BRS to the translator over the paths completed through its make contacts SS1–6, SS1–7, SS1–8, SS1–9 and SS1–10, which paths as described above include break contacts of relay SS2.

Release of the PCS relay sets up an operate path for relay WX (FIG. 6) from ground, make contact CS–9 of relay CS, break contact SS7–7 of relay SS7, break contact DT–6 of relay DT, break contact PCS–8 of relay PCS make contact ZX–3 of relay ZX, break contact WX–2 of relay WX, winding of relay WX to battery. Upon operation of relay WX, relay ZX holds over a path through make contact WX–3 of relay WX, its own make contact ZX–3 and over the remainder of the path just traced.

Upon the completion of outpulsing of the second digit relay PCS again operates and interrupts at its PCS–8 break contact the holding path just referred to for relay ZX which thereupon releases. Relay ZX, released, completes an operating path for the second digit selection relay SS2, this path being from battery, winding of relay SS2, break contact SS2–12 of relay SS2, make contact SS1–11 of relay SS1, break contact ZX–4 of relay ZX, make contact CS–8 of relay CS to ground. Operation of the second digit selection relay steers the third digit stored in unit CRS to the translator over an obvious path similar to those previously described.

Subsequent release of the PCS relay releases the WX relay (previously held through its make contact WX–4, lead 124 and make contact PCS–7 of relay PCS), which partially prepares the operate path of relay ZX for completion upon the next operation of relay PCS. The circuit continues to operate in this progressive stepping manner for selection of subsequent digits.

It will be noted that relay SS1, after operating as above described, locks up over a path from battery, its operating winding and make contact SS1–11, break contact SS7–9 of relay SS7 and make contact CS–11 of relay CS to ground, and that relay SS2, after operating, locks to the same ground through its own make contact SS2–15 and make contact SS1–12 of relay SS1. Similarly relay SS3, after operating over the path through make contact SS2–13 of relay SS2, locks to ground through its own make contact SS3–11 and make contacts SS2–14 of relay SS2 and CS10 of relay CS to ground. Similarly, relay SS4, after operating through make contact SS3–12 of relay SS3 and its own break contact SS4–12, locks to ground through its make contact SS3–13, and relay SS5, after operating through make contact SS4–13 of relay SS4, locks to ground through its own make contact SS5–11 and make contacts SS4–14 of relay SS4 and CS–9 of relay CS to ground. In a similar manner relay SS6, after operating through make contact SS5–12 of relay SS5, locks to ground through its own make contact SS6–12 and make contacts SS5–13 of relay SS5 and CS–9 of relay CS, while relay SS7 after operating through make contact SS6–13 of relay SS6 locks to ground through its own make contact SS7–8 and make contact CS–9 of relay CS.

*Recycle and Guard*

In instances where the dialing information exceeds seven digits, such, for example, as a direct distance dialed call, the novel arrangement contemplated by the present invention is such that the first five storage units will be recycled, after operation of the seventh digit steering circuit relay, whereby to permit use of these storage units for the additional digits. However, the novel arrangement includes, as will be described in detail below, means for guarding against a premature release of the storage units in the event the attendant's pushbutton dialing speed has too greatly outdistanced the outpulsing speed of the register sender; specifically, if the sixth digit is pushbutton dialed before the fourth registered digit is being outpulsed.

Normally, i.e. assuming for the moment that the outpulsing speed had kept in line with the dialing speed and the guarding procedure was not required, the recycle circuit (FIG. 5) will function following registration of the seventh digit. Registration of the seventh digit causes operation of steering circuit relay D7 (FIG. 3) which, in turn, completes an operating path for relay RC (FIG. 5) traced from battery, winding of relay RC, make contacts D7–1 of relay D7 and CS–12 of relay CS to ground. Relay RC, operated, causes the release of all operated relays in storage units ARS to ERS as well as the release of steering circuit relays D1 to D5; this action results from the fact that the respective locking paths for the relays are opened at break contacts of the now operated RC relay. These paths over which the resective relays were held are similar and all need not be traced at this point. The previous locking path for the D1 relay, for example, was established from battery, make contact D1–14 and operating winding of relay D1, lead 127, a respective two of the make contacts AR0–1, AR1–1, AR2–1, AR4–1 and AR7–1 of the ARS storage unit depending upon the particular relays operated, lead L1 of the recycle circuit (FIG. 5), break contacts RC–1 of relay RC and DT1–8 of relay DT1, make contacts CS–13 of relay CS to ground; upon operation of relay RC, as above, this path is interrupted at its break contact RC–1. The previous locking paths for the operated relays of the ARS storage units are similar to that of the D1 relay except that battery is found at the respective relay and the path includes a respective make contact AR0–2, AR1–2, AR2–2, AR4–2 or AR7–2; upon operation of relay RC these paths are interrupted at its break contact RC—1.

Following operation of relay SS7 of the sequential digit selecting circuit and during a released interval of relay ZX, relay RC1 (FIG. 5) will operate from battery, winding of relay RC1, make contact SS7–10 of relay SS7, break contact ZX–5 of relay ZX, break contact SS1–14 of relay SS1, make contact CS–11 of relay CS to ground, and upon operating will lock to ground through its own make contact RC1–1.

Release of the D1 to D5 steering relays completes respective operating paths for auxiliary locking relays AL1 to AL5 of the recycle circuit (FIG. 5) from ground, through respective break contacts D1–13 of relay D1, D2–1 of relay D2, D3–1 of relay D3, D4–1 of relay D4 and D5–1 of relay D5, the respective operating windings, and through make contact RC–2 of relay RC to battery. (It should be noted here that relay D7 is held operated from battery, its make contact D7–3 and operating winding, make contacts of the respective two operated relays in storage unit GRS, over lead L6 (FIG. 5) and make contact CS–14 of relay CS to ground, hence relay RC remains operated through make contacts D7–1 of relay D7 and CS–12 of relay CS.)

The auxiliary locking relays AL1 to AL5, upon operating, lock from battery, make contact RC–2 of relay RC, operating windings and respective make contacts AL1–1, AL2–1, AL3–1, AL4–1 and AL5–1, and make contact CS–15 of relay CS to ground; the auxiliary locking relays, operated, provide the following auxiliary locking paths for the storage unit relays which will be reoperated by dialing of the additional digits:

ARS—line L1, make contact RFC–3 of relay RC, make contact AL1–1 of relay AL1, make contact CS–13 of relay CS to ground;

BRS—line L2, make contact RC–4 of relay RC, make contact AL2–2 of relay AL2, make contact CS–19 of relay CS to ground;

CRS—line L3, make contact RC–5 of relay RC, make contact AL3–2 of relay AL3, make contact CS–18 of relay CS to ground;

DRS—line L4, make contact RC–6 of relay RC, make contact AL4–2 of relay AL4, make contact CS–17 of relay CS to ground; and ERS—line L5, make contact RC–7 of relay RC, make contact AL5–2 of AL5, make contact CS–16 of relay CS to ground.

With regard now to the novel arrangement provided for guarding against a premature release of the storage units when the attendants' dialing speed has been faster than the outpulsing rate, let us assume that the sixth digit is being pushbutton dialed before the fourth registered digit is being outpulsed. For this condition relays SS3 and SS7 will be released and relay D6 operated and a path will be completed therefor from flutter circuit 72 (FIG. 5) break contact SS3–14 of relay SS3, make contact D6–2 of relay D6, break contact SS7–1 of relay SS7, break contact DT–4 of relay DT, break contact TF–1 of relay TF, make contact CS–6 of relay CS and over lead KR–73 to the attendants' position (FIG. 1) where it energizes attendants' lamp 35 at "flash" as a warning to the attendant to hold up dialing until the outpulsing of the fourth digit is completed. However, once the outpulsing of the fourth digit has been completed, relay SS3 will operate and steady ground will then be applied through make contact SS3–15 instead of the ground interrupted at "flutter" frequency previously applied through break contact SS3–14; lamp 35 will now light at "steady" as a signal to the attendant to resume dialing. It should be noted that even though the attendant should attempt to override the flutter signal and continue dialing the circuit will not recycle prematurely since, in accordance with the novel arrangement contemplated by the invention, the operating paths for the auxiliary locking relays AL1 to AL5 are completed progressively through break contacts of the digit selecting relays. Thus, no auxiliary locking relay of the group will operate until the corresponding digit selecting relay has released following outpulsing of the preceding digit; for example auxiliary locking relay AL4 will not operate until after the fifth digit has been outpulsed and relay D4 has released and closed the operating path for relay AL4 at break contact D4–1.

*Sender Release*

When the attendant has completed pushbutton dialing the called number she depresses the E ("end") key of the call transmitter 31 (FIG. 1) as an end-of-code information; this operation applies ground to the "4" digit lead and operates a storage circuit register relay. On a 7-digit central office call the end-of-digit code will normally be registered in the ARS storage unit while in the instance of an 11-digit direct distance dialed code the end-of-code digit 4 will normally be registered in the DRS storage circuit. When the end-of-code information is transmitted to the translator, under control of the sequential digit selector circuit, relay T4 operates and completes an operate path for the RLS relay of the release circuit (FIG. 8) from battery, winding of relay RLS, break contact T7–3 of relay T7, make contact T4–1 of relay T4, break contacts T2–3 of relay T2, T1–1 of relay T1 and T0–1 of relay T0 to ground; relay RLS upon operating locks through its own make contact RLS–1 and make contact CS–20 of relay CS to ground.

Relay RLS, operated, removes at its break contact RLS–2 the ground from lead CT–63 (FIG. 7) to the register sender link circuit 34, and establishes at its RLS–3 make contact an additional path for connection of ground to lead MB–64 to the register sender link circuit. Removal of ground from lead CT–63 causes the register sender link circuit to function and remove ground from the CS–36 lead; this ground was previously supplied to the attendants' lamp 35, which now goes dark, and to relay CS of the seizure circuit, which now releases.

Release of relay CS removes battery from the previously described pulse counter, interdigital timing, end-of-pulse train, and clear circuits and removes ground from the central office trunk testing, pulse generator, sequential digit selector, recycle and ASB register circuits. Release of the PC relay in the end-of-pulse circuit (FIG. 5) causes the release of relay PCS by opening the operate path at make contact PC-6. Release of relay PCS releases relay RLS, previously held to ground (after release of relay CS) through its make contact RLS-1 and make contact PCS-9 of relay PCS; this removes, at make contact RLS-3, ground from lead MB-64 and the register sender is now in normal, idle condition.

*Clear Operation*

Normally the operating winding of relay CL of the clear circuit (FIG. 6) is shunted by ground from any of the digit leads "0," "1," "2" or "4" over lead 131 and through its own break contact CL-4. However, there is ordinarily provided at a convenient location, for example at the attendants' position, a "release" key (not shown) the operation of which is effective to apply ground only to the "7" digit lead; this ground applied over lead 132 will pass through the operating winding of relay CL, make contact CS-21 of relay CS to battery thereby operating relay CL, which then locks to ground through its make contact CL-5 and opens lead 131 at break contact CL-4. Relay CL, operated, removes at its CL-6 break contact negative battery from electrode 68 of timer tube 71, opens at its break contact CL-3 (FIG. 8) the connection to ring connector 122, disconnects negative battery at its CL-7 break contact and connects at its CL-8 make contact capacitor 133 into the timing path whereby to cause a clearing time (loop open) of approximately two seconds, and transfers at its CL-9 make contact the main anode circuit of timer tube 71 through break contact CLL-1 to one side of the winding of relay CLL. Upon completion of the 2-second clearing time tube 71 ionizes and operates relay CLL. Relay CLL, operated, extinguishes tube 71 by opening at break contact CLL-1 the main anode path and reconnecting at make contact CLL-2 negative battery potential to electrode 68. Operation of relay CLL also completes at its make contact CLL-3 a path for operating relay RLS of the release circuit (FIG. 8) which causes the circuit to restore to normal as above described.

*Invalid Code Check*

Contacts of the translator relays T0, T1, T2, T4 and T7 controlling the operating paths of the TF relay in the trouble finder circuit (FIG. 8) will cause the operation of the TF relay whenever an improper code is transmitted, that is a code other than two-out-of-five with the exceptions of the single "4" and "7" codes which are "valid" codes. Provision of the break contacts T7-4 of relay T7 and T4-2 of relay T4 prevent the operation of relay TF when either codes "4" or "7" are transmitted. However, this is not true of any other single codes. For example, let us assume first that relay T0 operates by the single code "0." We then have a path from ground, make contact T0-2 of relay T0, break contacts T1-2 of relay T1, T2-4 of relay T2, T4-2 of relay T4, T7-4 of relay T7, winding of relay TF to battery; relay TF operates over this path. However, if the code "0" is properly combined with codes "1," "2," "4" or "7" the path will be open at the corresponding break contact and the relay will not operate. For further illustration, assume that code 2 is transmitted singly, relay TF will then be operated over a path from ground, break con- T0-3 of relay T0, break contact T1-3 of relay T1, make contact T2-5 of relay T2, break contacts T4-2 of relay T4 and T7-4 of relay T7, winding of relay TF to battery. Assuming now that we have an improper code combination of "1," "2," and "4," we find an operating path for relay TF completed through break contact T0-3 of relay T0, and make contacts T1-4 of relay T1, T2-6 of relay T2 and T4-3 of relay T4.

Improper codes as above may result from improper pushbutton operation (two or more buttons depressed simultaneously), shorts or opens in the leads, stuck relay or the like. When the TF relay operates as above described, interrupted ground (120 IPM) is applied through make contacts TF-5 of relay TF and CS-6 of relay CS to lead KR-73 (FIG. 5) which causes the attendants' lamp 35 (FIG. 1) to flash at the rate of 120 IPM. This indicates a trouble condition to the attendant who may then clear the circuit by operation of her release key as described above under Clear Operation.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In an automatic telephone system, a call transmitter for transmitting a plurality of sequentially related digits the first of which may be a central office trunk seizure code, a register sender and a connecting circuit, said register sender including a plurality of register units for storing in turn the respective digits transmitted by said call transmitter, means included in said register sender for outpulsing the stored digit information to said connecting circuit, and means, effective upon registering in the first of said register units and subsequently outpulsing a central office trunk seizure code digit, for recycling the first register unit whereby the digit next transmitted is stored in said first register unit.

2. In an automatic telephone system, a call transmitter for transmitting a plurality of sequentially related digits the first of which may be a central office trunk seizure code, a register sender and a connecting circuit, a plurality of individual register units included in said register sender for storing the digits transmitted by said call transmitter, means for outpulsing the stored information to said connecting circuit, means for directing each transmitted digit to the respective register units in turn, and means, effective upon registering in the first of said register units, and subsequently outpulsing, a central office trunk seizure code digit for rendering said directing means ineffective with respect to the digit next transmitted whereby such digit is stored in said first register unit.

3. In an automatic telephone system, a call transmitter for transmitting a plurality of sequentially related digits greater in number than seven, a register sender and a connecting circuit, said register sender including seven register units for storing the respective seven digits first transmitted by said call transmitter, means included in said register sender for outpulsing the stored digit information to said connecting circuit, recycling means effective upon transmission by said call transmitter of the seventh digit for restoring the first five of said register units to normal for reception of additional digits, and means for preventing the operation of said recycling means if a predetermined number of the stored digits have not been outpulsed when the sixth digit is transmitted by said call transmitter.

4. In an automatic telephone system, the combination defined by claim 3 further characterized in that said predetermined number is a number not less than four.

5. In an automatic telephone system, the combination defined by claim 3 further characterized in the provision of signaling means for indicating that said predetermined number of stored digits have not been outpulsed prior to transmission of the seventh digit.

6. In an automatic telephone system, an attendant's position, a call transmitter at said position for transmitting a plurality of sequentially related digits the first of which may be a central office seizure code, a register sender and a connecting circuit, a plurality of individual register units in said register sender for storing in turn the respective digits transmitted by said call transmitter, means included in said register sender for outpulsing the stored digit information to said connecting circuit at a predetermined interdigital rate, and means effective upon transmission of a central office seizure code for changing said predetermined interdigital rate by a specific amount.

7. In an automatic telephone system, the combination defined by claim 6 further characterized in that said last-mentioned means includes a capacitor connected in a timing circuit and means for changing the effective value of said capacitor.

8. In an automatic telephone system, the combination defined by claim 7 further characterized in the provision of additional means effective upon direct seizure of a central office trunk for operating said effective value changing means.

9. In an automatic telephone system, an attendant's position, a call transmitter at said position for transmitting a plurality of sequentially related digits greater in number than seven the first of which may be a central office seizure code, an attendant's signal lamp at said position, a battery potential connected to one side of said lamp, a register sender and a connecting circuit, means included in said register sender for storing the respective seven digits first transmitted by said call transmitter, means for outpulsing the stored digit information to said connecting circuit, a source of ground interrupted at a predetermined frequency, a source of steady ground, means effective upon seizure of a central office trunk responsive to transmission of a central office trunk seizure code for connecting said source of interrupted ground to the other side of said attendant's lamp whereby to flash said lamp as a stop dialing indication to the attendant, means effective when the seized trunk is in condition to receive pulses for disconnecting said source of intermittent ground from said other side of the attendant's lamp and for connecting thereto said source of steady ground whereby to light said lamp steadily, and means effective upon transmission of the sixth digit by said call transmitter before a predetermined number of the registered digits have been outpulsed for connecting said source of interrupted ground to said other side of said attendant's lamp to again flash said lamp as a stop dialing indication to the attendant.

10. In a telephone system, the combination defined by claim 9 further characterized in the provision of means effective upon the outpulsing of said predetermined number of registered digits for disconnecting said source of interrupted ground and for connecting said source of steady ground to said other side of said attendant's lamp whereby to light said lamp steadily as a resume dialing indication to the attendant.

11. In an automatic telephone system, a call transmitter for transmitting a plurality of sequentially related digits greater in number than seven, a register sender and a connecting circuit, seven register units in said register sender for storing the respective seven digits first transmitted by said call transmitter, respective locking circuits for said register units, means including seven digit directing relays for directing each respective transmitted digit to the respective one of said register units, means in said register sender for outpulsing the stored digit information to said connecting circuit, recycling means effective upon transmission by said call transmitter of the seventh digit for restoring the first five of said register units to normal for reception of additional digits, and means for preventing the operation of said recycling means if a predetermined number of the stored digits have not been outpulsed when the sixth digit is transmitted by said call transmitter.

12. In an automatic telephone system, the combination defined by claim 11 further characterized in that said recycling means includes auxiliary locking paths for said register units.

13. In an automatic telephone system, the combination defined by claim 12 further characterized in that said preventing means includes paths through break contacts of respective ones of said digit directing relays for establishing said auxiliary locking paths.

References Cited in the file of this patent

UNITED STATES PATENTS

| | | |
|---|---|---|
| 2,333,485 | Molnar | Nov. 2, 1943 |
| 2,724,020 | Judy | Nov. 15, 1955 |
| 2,726,285 | Regan | Dec. 6, 1955 |
| 2,921,986 | Boswau | Jan. 19, 1960 |
| 3,033,934 | Evans | May 8, 1962 |